(12) United States Patent
Berkner

(10) Patent No.: US 7,120,305 B2
(45) Date of Patent: Oct. 10, 2006

(54) ADAPTIVE NONLINEAR IMAGE ENLARGEMENT USING WAVELET TRANSFORM COEFFICIENTS

(75) Inventor: Kathrin Berkner, Menlo Park, CA (US)

(73) Assignee: Ricoh, Co., Ltd., Tokyo (JP)

( * ) Notice: Subject to any disclaimer, the term of this patent is extended or adjusted under 35 U.S.C. 154(b) by 421 days.

(21) Appl. No.: 10/124,290

(22) Filed: Apr. 16, 2002

(65) Prior Publication Data

US 2003/0194150 A1    Oct. 16, 2003

(51) Int. Cl.
G06K 9/36    (2006.01)
G06K 9/32    (2006.01)
H04B 1/66    (2006.01)

(52) U.S. Cl. .................. 382/240; 382/300; 375/240.19

(58) Field of Classification Search ................ 382/232, 382/240, 300, 254, 275; 358/525; 375/240.19
See application file for complete search history.

(56) References Cited

U.S. PATENT DOCUMENTS

| | | | |
|---|---|---|---|
| 3,580,655 A | 5/1971 | Leith et al. | |
| 3,950,103 A | 4/1976 | Schmidt-Weinmar | |
| 4,136,954 A | 1/1979 | Jamieson | |
| 4,155,097 A | 5/1979 | Lux | |
| 4,190,861 A | 2/1980 | Lux | |
| 4,223,354 A | 9/1980 | Noble et al. | |
| 4,393,456 A | 7/1983 | Marshall, Jr. | |
| 4,437,087 A | 3/1984 | Petr | |
| 4,569,075 A | 2/1986 | Nussbaumer | |
| 4,599,567 A | 7/1986 | Goupillaud et al. | |
| 4,652,881 A | 3/1987 | Lewis | |
| 4,663,660 A | 5/1987 | Fedele et al. | |
| 4,674,125 A | 6/1987 | Carlson et al. | |
| 4,701,006 A | 10/1987 | Perlmutter | |
| 4,751,742 A | 6/1988 | Meeker | |
| 4,760,563 A | 7/1988 | Beylkin | |
| 4,785,348 A | 11/1988 | Fonsalas et al. | |
| 4,785,349 A | 11/1988 | Keith et al. | |
| 4,799,179 A | 1/1989 | Masson et al. | |
| 4,805,129 A | 2/1989 | David | |
| 4,815,023 A | 3/1989 | Arbeiter | |
| 4,817,182 A | 3/1989 | Adelson et al. | |
| 4,821,223 A | 4/1989 | David | |
| 4,827,336 A | 5/1989 | Acampora et al. | |
| 4,829,378 A | 5/1989 | Le Gall | |
| 4,837,517 A | 6/1989 | Barber | |
| 4,839,889 A | 6/1989 | Gockler | |
| 4,858,017 A | 8/1989 | Torbey | |
| 4,864,398 A | 9/1989 | Avis et al. | |
| 4,868,868 A | 9/1989 | Yazu et al. | |

(Continued)

FOREIGN PATENT DOCUMENTS

EP    0510933 A1    10/1992

(Continued)

OTHER PUBLICATIONS

Ricardo Sanchez et al. (wavelet based adaptive interpolation for volume rendering IEEE- 1998, pp. 127-134.*

(Continued)

*Primary Examiner*—Kanjibhai Patel
(74) *Attorney, Agent, or Firm*—Blakely, Sokoloff, Taylor & Zafman LLP

(57) ABSTRACT

A method and apparatus for enlargement and resolution enhancement of images in the wavelet domain is described. In one embodiment, the method comprises receiving a wavelet representation of an image, where the wavelet representation comprises wavelet coefficients, and performing localized adaptive interpolation on the wavelet coefficients in the wavelet domain.

57 Claims, 11 Drawing Sheets

U.S. PATENT DOCUMENTS

| | | |
|---|---|---|
| 4,881,075 A | 11/1989 | Weng |
| 4,894,713 A | 1/1990 | Delogne et al. |
| 4,897,717 A | 1/1990 | Hamilton et al. |
| 4,899,147 A | 2/1990 | Schiavo et al. |
| 4,904,073 A | 2/1990 | Lawton et al. |
| 4,918,524 A | 4/1990 | Ansari et al. |
| 4,922,544 A | 5/1990 | Stansfield et al. |
| 4,929,223 A | 5/1990 | Walsh |
| 4,929,946 A | 5/1990 | O'Brien et al. |
| 4,936,665 A | 6/1990 | Whitney |
| 4,973,961 A | 11/1990 | Chamzas et al. |
| 4,974,187 A | 11/1990 | Lawton |
| 4,982,283 A | 1/1991 | Acampora |
| 4,985,927 A | 1/1991 | Norwood et al. |
| 4,987,480 A | 1/1991 | Lippman et al. |
| 4,999,705 A | 3/1991 | Puri |
| 5,000,183 A | 3/1991 | Bonnefous |
| 5,001,764 A | 3/1991 | Wood et al. |
| 5,014,134 A | 5/1991 | Lawton et al. |
| 5,018,210 A | 5/1991 | Merryman et al. |
| 5,049,992 A | 9/1991 | Citta et al. |
| 5,049,993 A | 9/1991 | Le Gall et al. |
| 5,068,911 A | 11/1991 | Resnikoff et al. |
| 5,072,308 A | 12/1991 | Lin et al. |
| 5,073,964 A | 12/1991 | Resnikoff |
| 5,081,645 A | 1/1992 | Resnikoff et al. |
| 5,095,447 A | 3/1992 | Manns et al. |
| 5,097,261 A | 3/1992 | Langdon, Jr. et al. |
| 5,097,331 A | 3/1992 | Chen et al. |
| 5,101,280 A | 3/1992 | Moronaga et al. |
| 5,101,446 A | 3/1992 | Resnikoff et al. |
| 5,103,306 A | 4/1992 | Weiman et al. |
| 5,109,451 A | 4/1992 | Aono et al. |
| 5,121,191 A | 6/1992 | Cassereau et al. |
| 5,124,930 A | 6/1992 | Nicholas et al. |
| 5,128,757 A | 7/1992 | Citta et al. |
| 5,128,791 A | 7/1992 | Le Gall et al. |
| 5,148,498 A | 9/1992 | Resnikoff et al. |
| 5,152,953 A | 10/1992 | Ackermann |
| 5,156,943 A | 10/1992 | Whitney |
| 5,173,880 A | 12/1992 | Duren et al. |
| 5,182,645 A | 1/1993 | Breeuwer et al. |
| 5,223,926 A | 6/1993 | Stone et al. |
| 5,235,434 A | 8/1993 | Wober |
| 5,241,395 A | 8/1993 | Chen |
| 5,262,958 A | 11/1993 | Chui et al. |
| 5,276,525 A | 1/1994 | Gharavi |
| 5,315,670 A | 5/1994 | Shapiro |
| 5,321,776 A | 6/1994 | Shapiro |
| 5,335,016 A | 8/1994 | Nakagawa |
| 5,347,479 A | 9/1994 | Miyazaki |
| 5,349,348 A | 9/1994 | Anderson et al. |
| 5,379,355 A | 1/1995 | Allen |
| 5,381,145 A | 1/1995 | Allen et al. |
| 5,384,869 A | 1/1995 | Wilkinson et al. |
| 5,412,741 A | 5/1995 | Shapiro |
| 5,414,780 A | 5/1995 | Carnahan |
| 5,416,604 A | 5/1995 | Park |
| 5,420,891 A | 5/1995 | Akansu |
| 5,442,458 A | 8/1995 | Rabbani et al. |
| 5,453,945 A | 9/1995 | Tucker et al. |
| 5,455,874 A | 10/1995 | Ormsby et al. |
| 5,481,308 A | 1/1996 | Hartung et al. |
| 5,495,292 A | 2/1996 | Zhang et al. |
| 5,497,435 A | 3/1996 | Berger |
| 5,497,777 A * | 3/1996 | Abdel-Malek et al. ...... 600/443 |
| 5,511,151 A | 4/1996 | Russell et al. |
| 5,534,925 A | 7/1996 | Zhong |
| 5,537,493 A | 7/1996 | Wilkinson |
| 5,541,594 A | 7/1996 | Huang et al. |
| 5,546,477 A | 8/1996 | Knowles et al. |
| 5,563,960 A | 10/1996 | Shapiro |
| 5,566,089 A | 10/1996 | Hoogenboom |
| 5,602,589 A | 2/1997 | Vishwanath et al. |
| 5,604,824 A * | 2/1997 | Chui et al. .................. 382/248 |
| 5,631,977 A | 5/1997 | Koshi |
| 5,638,498 A | 6/1997 | Tyler et al. |
| 5,657,085 A * | 8/1997 | Katto ....................... 348/398.1 |
| 5,701,367 A | 12/1997 | Koshi et al. |
| 5,717,789 A | 2/1998 | Anderson et al. |
| 5,754,793 A | 5/1998 | Eom et al. |
| 5,799,112 A * | 8/1998 | de Queiroz et al. ........ 382/254 |
| 5,808,683 A | 9/1998 | Tong et al. |
| 5,809,176 A | 9/1998 | Yajima |
| 5,850,482 A | 12/1998 | Meany et al. |
| 5,867,602 A | 2/1999 | Zandi et al. |
| 5,880,856 A | 3/1999 | Ferriere |
| 5,966,465 A | 10/1999 | Keith et al. |
| 6,020,975 A | 2/2000 | Chen et al. |
| 6,026,198 A | 2/2000 | Okada |
| 6,088,062 A | 7/2000 | Kanou et al. |
| 6,101,279 A * | 8/2000 | Nguyen et al. ............. 382/240 |
| 6,118,902 A | 9/2000 | Knowles |
| 6,121,970 A | 9/2000 | Guedalia |
| 6,128,413 A | 10/2000 | Benamara |
| 6,160,846 A | 12/2000 | Chiang |
| 6,201,897 B1 | 3/2001 | Nixon |
| 6,229,929 B1 | 5/2001 | Lynch et al. |
| 6,236,765 B1 | 5/2001 | Acharya |
| 6,237,010 B1 | 5/2001 | Hui et al. |
| 6,263,109 B1 | 7/2001 | Ordentlich et al. |
| 6,263,120 B1 | 7/2001 | Matsuoka |
| 6,327,392 B1 | 12/2001 | Li |
| 6,330,666 B1 | 12/2001 | Wise et al. |
| 6,339,658 B1 | 1/2002 | Moccagatta et al. |
| 6,350,989 B1 | 2/2002 | Lee et al. |
| 6,356,668 B1 | 3/2002 | Honsinger et al. |
| 6,466,698 B1 | 10/2002 | Creusere |
| 6,483,946 B1 | 11/2002 | Martucci et al. |
| 6,507,674 B1 * | 1/2003 | Yagishita et al. ........... 382/239 |
| 6,546,143 B1 | 4/2003 | Taubman et al. |
| 6,577,770 B1 * | 6/2003 | Martin et al. ............... 382/240 |
| 6,625,321 B1 | 9/2003 | Li et al. |
| 6,650,782 B1 | 11/2003 | Joshi et al. |
| 6,658,158 B1 * | 12/2003 | Fukuhara et al. ........... 382/240 |
| 6,668,090 B1 | 12/2003 | Joshi et al. |
| 6,728,411 B1 * | 4/2004 | Bottou et al. ............... 382/240 |
| 6,738,524 B1 * | 5/2004 | de Queiroz ................. 382/240 |
| 6,782,143 B1 * | 8/2004 | Dube et al. ................. 382/300 |
| 6,819,801 B1 * | 11/2004 | Kakarala et al. ............ 382/240 |
| 6,832,001 B1 * | 12/2004 | Kashiwagi .................. 382/166 |
| 2001/0021223 A1 | 9/2001 | Andrew |
| 2001/0047517 A1 | 11/2001 | Christopoulos et al. |
| 2003/0110299 A1 | 6/2003 | Larsson et al. |

FOREIGN PATENT DOCUMENTS

| | | |
|---|---|---|
| EP | 0593013 A2 | 4/1994 |
| EP | 0611051 A1 | 8/1994 |
| EP | 0622741 A2 | 11/1994 |
| EP | 701375 A2 | 3/1996 |
| EP | 0967556 A2 | 12/1999 |
| EP | 1035511 A2 | 9/2000 |
| EP | 1 164 781 A1 | 12/2001 |
| EP | 1164781 A1 | 12/2001 |
| GB | 2 211 691 A | 7/1989 |
| GB | 2 284 121 A | 5/1995 |
| GB | 2 285 374 A | 7/1995 |
| GB | 2 293 733 A | 4/1996 |
| GB | 2 293 734 A | 4/1996 |
| GB | 2 303 030 A | 2/1997 |
| GB | 2 303 031 A | 2/1997 |
| GB | 2 341 035 A | 3/2000 |
| JP | 406038193 A | 7/1992 |

| | | |
|---|---|---|
| JP | 06-245077 | 9/1994 |
| JP | 6-350989 | 12/1994 |
| JP | 7-79350 | 3/1995 |
| WO | WO 88/10049 | 12/1988 |
| WO | WO 91/03902 | 3/1991 |
| WO | WO 91/18361 | 11/1991 |
| WO | WO 93/10634 | 5/1993 |
| WO | WO 94/17492 | 8/1994 |
| WO | WO 94/23385 | 10/1994 |
| WO | WO 95/19683 | 7/1995 |
| WO | WO 96/09718 | 3/1996 |
| WO | WO 00/49571 | 8/2000 |
| WO | WO 01/16764 A1 | 3/2001 |

OTHER PUBLICATIONS

Xuguang Yang et al. (Scalable wavelet Video Coding Using Aliasing-Reduced Hierarchical Motion Compensation) IEEE, 2000, pp. 778-791.*
Allebach, J., Wong, P.W., "Edge-Directed Interpolation," Proceedings of ICIP'98, pp. 707-710, 1998.
Li, X., Orchard, M., "New Edge Directed Interpolation," Proceedings of ICIP'2000, Vancouver, 2000, pp. 311-314.
Chang, S.G., et al.: "Resolution Enhancement Of Images Using Wavelet Transform Extrema Extrapolation," Proceedings of ICASSP'95, pp. 2379-2382, 1995.
Antonini, et al., "Image Coding Using Wavelet Transform", *IEEE Transactions on Image Processing*, vol. 1, No. 2, Apr. 1992, pp. 205-220.
Blumberg, et al., "Visual Realism and Interativity for the Internet", IEEE, 1997, pp. 269-273.
Boliek, et al., "Decoding compression with reversible embedded wavelets (CREW) codestreams", Journal of Electronic Imaging, Jul. 1998, vol. 7 (3), pp. 402-409.
Boliek, et al., "JPEG 2000 for Efficient Imaging in a Client/Server Environment", Proceeding of the PIE, SPIE, Bellingham, VA, US, vol. 4472, Jul. 31, 2001, pp. 212-223, XP008010308.
Boliek, et al., "JPEG 2000 Next Generation Image Compression System", IEEE 0-7803-6297, 45-48.
Calderbank, et al., "Wavelet Transforms That Map Integers to Integers", Aug. 1996.
Carey, et al: "Regularity-Preserving Image Interpolation", IEEE Transactions on Image Processing, vol. 8., No. 9, Sep. 1999, pp. 1293-1297, XP002246254.
Carrato, et al: "A Simple Edge-Sensitive Image Interpolation Filter", Proceedings of the International Confrence on Image Processing (ICIP) Lausanne, Sep. 16-19, 1996, New York, IEEE, US, vol. 1, pp. 711-714, XP010202493.
Chen, et al., "Wavelet Pyramid Image Coding with Predictable and Controllable Subjective Picture Quality", *IEICE Trans. Fundamentals*, vol. E76-A., No. 9, Sep. 1993, pp. 1458-1468.
Cheong, et al., "Subband Image Coding with Biorthogonal Wavelets", *IEICE Trans. Fundamentals*, vol. E75-A., No. 7, Jul. 1992, pp. 871-881.
Chrysafis, et al., "An Algorith for Low Memory Wavelet Image Compression", IEEE 0-7803-5467-Feb. 1999, p. 354-358.
Chrysafis, et al., "Line Based Reduced Memory, Wavelet Image Compression," Data Compression Conference, 1998, DCC '98, Proceedings Snowbird, UT, Mar. 1998, pp. 398-407.
Chui, et al., "Wavelets on a Bounded Interval", *Numerical Methods of Approximation Theory*, vol. 9, 1992, p. 53-75.
Crochiere, et al., "Digital Coding of Speech in Sub-bands", 1976, American Telephone and Telegraph Company, The Bell System Technical Journal, vol. 55, No. 8, Oct. 1976, p. 1069-1085.
Denk, et al., "Architectures for Lattice Structure Based Orthonormal Discrete Wavelet Transforms", *IEEE*, 1994, pp. 259-270.
Deshpande, et al., "HTTP Streaming of JPEG2000 Images", IEEE, 2001, pp. 15-19.
Dutch Search Report, 133082, Nov. 26, 1996.
Esteban, et al., "1977 IEEE International Conference on Acoustics, Speech & Signal Processing", "Application of Quadrature Mirror Filters to Split Band Voice Coding Schemes", p. 191-195.
French Search Report, FR9511023, Nov. 26, 1996.
French Search Report, FR9511024, Nov. 26, 1996.
German Search Report, Dated Mar. 21, 1997, 3 pages.
Gharavi, et al., "Proceedings: ICASSP 87", 1987 International Conference on Acoustics, Speech, and Signal Processing, Apr. 6, 7, 8, 9, 1987, vol. 4 of 4, "Application of Quadrature Mirror Filtering to the Coding of Monochrome and Color Images", p. 2384-2387.
Gharavi, et al., "Sub-band Coding of Digital Images Using Two-Dimensional Quadrature Mirror Filtering:, SPIE vol. 707 Visual Communications and Image Processing", 1986, p. 51-61.
Gordon, Benjamin M., et al., "A 1.2 mW Video-Rate 2-D Color Subband Decoder,"IEEE Journal of Solid-State Circuits, IEEE Inc. New York, vol. 30, No. 12, Dec. 1, 1995, pp. 1510-1516.
Hauf, et al., "The FlashPix™ Image File Format", The Fourth Color Imaging Conference: Color Science, Systems and Application, 1996, pp. 234-238.
Howard, et al., "Fast and Efficient Lossless Image Compression", *IEEE*, 1993, pp. 351-360.
Information Technology—JPEG 2000 Image Coding System—Part 1: Core Coding System, ISO/IEC 15444-1, Dec. 15, 2000, p. 5, 14, 22.
International Search Report for Application No.: GB 9518298.6 dated Nov. 8, 1995.
JPEG 2000 Part 1 Final Committee Draft Version 1.0, Image Compression Standard described in ISO/IEC 1/SC 29/WG 1 N1646, Mar. 16, 2000.
Komatsu, et al., "Reversible Subband Coding of Images", SPIE vol. 2501, pp. 676-648.
Langdon, Jr., "Sunset: A Hardware-Oriented Algorithm for Lossless Compression of Gray Scale Images", *SPIE vol. 1444, Image Capture, Formatting, and Display*, 1991, pp. 272-282.
Le Gall, et al., "Sub-band coding of Digital Images Using Symmetric Short Kernal Filters and Arithmetic Coding Techniques", 1988, International Conference on Acoustics, Speech and Signal Processing, pp. 761-764.
Lewis, et al., "Image Compression Using the 2-D Wavelet Transform", *IEEE Transactions on Image Processing*, vol. 1, No. 2, Apr. 1992, pp. 244-250.
Lux, P., "A Novel Set of Closed Orthogonal Functions for Picture Coding", 1977, pp. 267-274.
Marcellin, et al., "An Overview of JPEG-2000", Proceedings. DCC 2000 Snowbird, UT, USA, Mar. 28-30, 2000, pp. 523-541, XP010377392.
Meng, Teresa H., "A Wireless Portable Video-on-Demand System," VLSI Design, 1998, Proceedings Eleventh International Conference on Chennai, India 407, Jan. 1998, California, pp. 4-9.
Ohta, et al., "Wavelet Picture Coding with Transform Coding Approach", Jul. 1992, No. 7, pp. 776-784.
Padmanabhan, et al., "Feedback-Based Orthogonal Digital Filters", *IEEE Transactions on Circuits and Systems*, Aug. 1993, No. 8, pp. 512-525.
Pollara et al., "Rate-distortion Efficiency of Subband Coding with Integer Coefficient Filters", Jul. 1994, p. 419, Information Theory, 1994, IEEE.
Reeves, et al: "Multiscale-Based Image Enhancement", Electrical and Computer Engineering, 1997. Engineering Innovation: Voyage of Discovery. IEEE 1997 Canadian Conference on St. Johns, NFLD., Canada May 25-28, 1997, New York, NY. (pp. 500-503), XP010235053.
Reusens, "New Results in Subband/Wavelet Image Coding", May 1993, p. 381-385.
Said, et al., "Image Compression Using the Spatial-Orientation Tree", *IEEE*, 1993, pp. 279-282.
Said, et al., "Reversible Image Compression Via Multiresolution representation and Predictive Coding", Aug. 11, 1993, pp. 664-674.
Shah, et al., "A Chip Set for Lossless Image Compression", *IEEE Journal of Solid-State Circuits*, vol. 26, No. 3, Mar. 1991, pp. 237-244.
Shapiro, J. M., "An Embedded Hierarchical Image Coder Using Zerotrees of Wavelet Coefficients", *IEEE*, 1993, pp. 214-223.
Shapiro, J. M., "Embedded Image Coding Using Zerotrees of Wavelet Coefficients", *IEEE Transactions on Signal Processing*, Dec. 1993, No. 12, pp. 3445-3462.

Smith, et al., "Exact Reconstruction Techniques for Tree-Structured Subband Coders", IEEE Transactions on Acoustics, Speech, and Signal Processing, vol. ASSP-34, No. 3, Jun. 1986, p. 434-441.

Stoffel, et al: "A Survey of Electronic Techniques For Pictorial Image Reproduction," IEEE Transactions On Communications, vol. COM-29, No. 12, Dec. 1981, pp. 1898-1925, XP000560531 IEEE, New York (US).

SZU, et al., "Image Wavelet Transforms Implemented by Discrete Wavelet Chips", *Optical Engineering*, Jul. 1994, vol. 33, No. 7, pp. 2310-2325.

Vetterli, Martin, "Filter Banks Allowing Perfect Reconstruction", Signal Processing 10 (1986), p. 219-244.

Vetterli, Martin, "Multi-Dimensional Sub-band Coding: Some Theory and Algorithms", Signal Processing 6 (1984) p. 97-112.

Villasenor, et al., "Filter Evaluation and Selection in Wavelet Image Compression", *IEEE*, 1994, pp. 351-360.

Westernick, et al., "Proceedings: ICASSP 87", 1987 International Conference on Acoustics, Speech, and Signal Processing, Apr. 6, 7, 8, 9, 1987, vol. 3 of 4, "Sub-band coding of Images Using Predictive Vector Quantization", p. 1378-1381.

Woods, "Subband Image Coding", 1991, pp. 101-108, 163-167, and 180-189.

Woods, et al., "Subband Coding of Images", *IEEE Transactions on Acoustics, Speech, and Signal Processing*, vol. 1 ASSP-34, No. 5, Oct. 1986, pp. 1278-1288.

Woods, et al., "Sub-band coding of Images", Proceedings ICASSP 86, Tokyo, Japan, Apr. 1986, p. 1005-1008.

Wu, et al., "New Compression Paradigms in JPEG2000", Applications of Digital Image Processing XXIII, San Diego, CA USA, Jul. 31-Aug. 3, 2000, vol. 4115, pp. 418-429, XP008013391, Proceedings of the DPIE—The International Society for Optical Engineering, 2000, SPIE-Int. Soc. Opt. Eng., USA.

Xiong, et al., "Joint Optimization of Scalar and Tree-structured Quantization of Wavelet Image Decompositions", Jan. 11, 1993, pp. 891-895.

Carrato, Sergio, et al: "A Simple Edge-Sensitive Image Interpolation Filter", Proceedings of the International Conference on Image Processing (ICIP) Lausanne, Sep. 16-19. 1996, New York, IEEE, US, vol. 1, pp. 711-714, XP010202493.

Carey, W. Knox, et al: "Regularity-Preserving Image Interpretation", IEEE Transactions on Image Processing, vol. 8., No. 9, Sep. 1999, pp. 1293-1297, XP002246254.

Reeves, T.H., et al: "Multiscale-Based Image Enhancement", Electrical and Computer Engineering, 1997. Engineering Innovation: Voyage of Discovery. IEEE 1997 Canadian Conference on St. Johns, NFLD., Canada May 25-28, 1997, New York, NY. (pp. 500-503), XP010235053.

Carrato, Sergio, et al. "A Simple Edge-Sensitive Image Interpolation Filter", Copyright 1996 IEEE 0-7803-3258-X/96 pp. 711-714 DEEI, University of Trieste, Italy.

Knox Carey, W., et al. "Regularity-Preserving Image Interpolation" pp. 1293-1297, IEEE Transactions on Image Processing, vol. 8, No. 9, Sep. 1999. 1057-7149/99 Copyright 1999 IEEE.

Reeves, T.H., et al "Multiscale-Based Image Enhancement", pp. 500-503, Copyright 1997 IEEE, 0-7803-3716-6/97 CCECE'97 Department of Systems Design Engineering, University of Waterloo, Ontario Canada N2L 3G1.

Revathy, K., et al. "Image Zooming By Wavelets", pp. 247-253, Received May 7, 2000, Accepted Jun. 28, 2000. XP-000986588, Fractals, vol. 8, No. 3 (2000) Copyright World Scientific Publishing Company.

\* cited by examiner

FIG. 1

ADAPTIVE NONLINEAR IMAGE ENLARGEMENT USING WAVELET TRANSFORM COEFFICIENTS

FIELD OF THE INVENTION

The present invention relates to the field of image processing; more particularly, the present invention relates to edge preserving image interpolation with wavelets.

BACKGROUND OF THE INVENTION

Resizing of digital images is often performed in digital imaging processing and becomes more important in networks environments that include devices with different dpi resolution. While aliasing and moiré artifacts are the main problems in image reduction, enlargement of images has to deal with the problem of how to introduce high frequency components in order to have the image, in particular edges, not appear too smooth or too blurred. A typical method for enlargement of images is the use of an interpolation filter. This filtering incorporates information from neighboring pixels in order to predict an interpolation value. Commonly used filters as, e.g., in a popular photo-image manipulation application, are bilinear or bicubic interpolation filters. With the use of those filters a perfect step edge cannot be interpolated to produce a perfect step edge at a higher resolution. The interpolated edge will always look a bit blurred.

A standard method for image interpolation is polynomial interpolation. Depending on the degree of the interpolating polynomial (e.g., linear, quadratic, cubic, etc.), the image looks more or less smooth. The most commonly used technique is referred to as cubic interpolation. An advantage of polynomial methods is their simplicity since they are based on global linear filtering techniques. A disadvantage is that it is not possible to perform an adaptive interpolation, thereby resulting in edges typically being oversmoothed. This is a significant disadvantage in enlargement of documents.

Other interpolation filters exist, such as Keys filters, that are relatives of polynomial interpolation filters, but have characteristics of unsharp masking filters, i.e. they enhance high frequency content by creating a overshoot-undershoot at edges and an overshoot-undershoot is also created for noise pixel and leads to increase the noise level in the image. Since all these filters operate globally on the entire image, adaptive interpolation is not possible. A trade-off exists between enhancement of edges and suppressing noise in background areas.

Non-linear interpolation methods exist that operate in the pixel domain and extract edge information from the image and use that information to perform an edge-directed interpolation. One method first computes an edge map of the low resolution image using the Laplacian-of-Gaussian. In a second step, a preprocessing of the low resolution image using the edge information is performed to avoid errors in an estimated high resolution edge map. The third step performs interpolation using the edge information. In smooth areas, a bilinear interpolation is performed. Near edges, interpolated values are replaced by values that keep the sharpness of the edges. At last, an iterative correction step is performed to further improve the interpolation. A typical number of iterations is 10. See Allebach, J., and Wong, P. W., "Edge-directed interpolation," Proceedings of ICIP'98, pp. 707–710, 1998.

In another method, local covariance characteristics in the low resolution image are estimated and those estimates are used to perform classical Wiener filtering interpolation. Since local covariances are part of the filter coefficients, a smoothing along edges, but not across edges, is performed. A disadvantage of this method is that isolated dots are not well-preserved after interpolation since they are treated as very short edges. See Li, X., and Orchard, M., "New edge directed interpolation," Proceedings of ICIP'2000, Vancouver, 2000.

Compared to the previous two methods, a very simple edge sensitive interpolation method is proposed in Carrato, S., Ramponi, G., and Marsi. S., "A simple edge-sensitive image interpolation filter," Proceedings of ICIP'96, pp. 711–714, 1996. This technique employs a nonlinear filter to determine the interpolating sample value. In detail, for a one-dimensional signal a local linear interpolation, $$x_{int} = \mu_k x_k + (1 - \mu_k) x_{k+1} \quad (1)$$

is performed. If $x_{int}$ is close to 0, the interpolating value is similar to the sample to the right, whereas if $x_{int}$ is close to 1, the interpolating value is similar to the sample to the left. This placement depends on the smoothness of the low resolution signal in a neighborhood of the interpolating value and is computed via the nonlinearity $$\mu_k = \frac{k(x_{k+1} - x_{k+2}) - 1}{k((x_{k-1} - x_k)^2 + (x_{k+1} - x_{k+2})^2) + 2} \quad (2)$$

where k is a parameter that controls the edge sensitivity. For k=0, linear interpolation is obtained, while positive values of k cause increased edge sensitivity. An advantage of this nonlinear technique is its simplicity—no iterations are necessary. A disadvantage of this technique is that the parameter k must be tuned and that isolated short edges do not get enlarged and look a bit "squeezed" in the interpolated image. Furthermore, the interpolation of a perfect step edge, e.g., $x_{k-1} = x_k = 1$, $x_{k+1} = x_{k+2} = 0$, is not a perfect step edge anymore: 1, 1, 1, 1/2, 0, 0, 0. A linear interpolation is performed.

Figure 1:
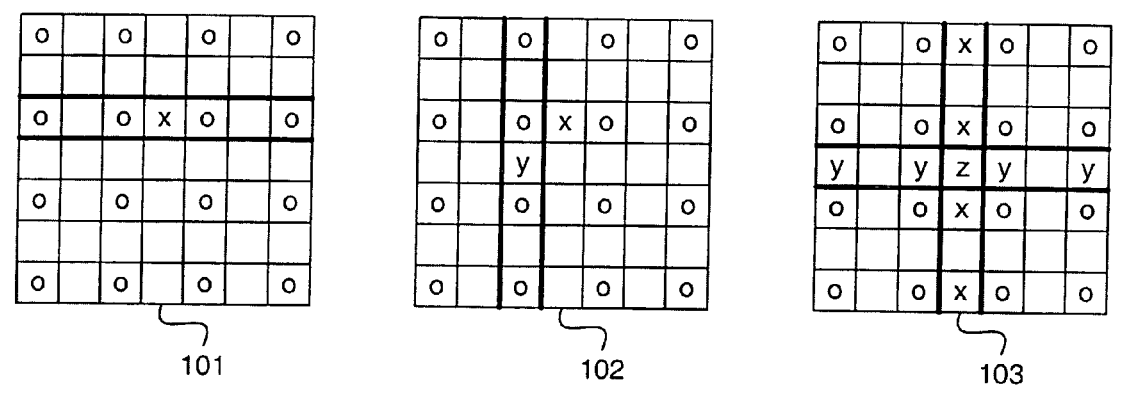

FIG. 1 is a schematic diagram illustrating a two-dimensional extension of one-dimensional nonlinear interpolation methods. The pixel locations containing "o" in FIG. 1 are representative of pixels of the low resolution image. An extension to two dimensions is performed by applying the one-dimensional method separately to rows and columns of the low resolution image $I_{low}$, shown in matrix 101, with the results combined into $I_{comb}$, shown in matrix 102. The missing values are interpolated as averages of interpolation on rows and columns in the combined image $I_{int}$, shown in matrix 103.

Several techniques exist that explore multiresolution structures of images in the wavelet domain to extrapolate images. A general approach to edge preserving image interpolation with wavelets is to add an additional high frequency band to the wavelet decomposition of the low resolution image. Some prior art techniques determine the location of an edge by extrapolating extrema of wavelet coefficients across scales, or decomposition levels. This extrapolation typically requires a localization and a least-square fit of the extremes. A problem with those approaches is that the alignment of an edge is never sufficient. For extrapolating smoother images, it is less significant, but rather severe for extrapolation of text. One way to overcome this problem includes iterating on the extrapolation in order to better map the downsampled high resolution image to the original low resolution image. For more information, see Carey, W. K., Chuang, D. B., and Hemami, S. S., "Regularity-Preserving Image Interpolation," Trans. Image Processing, vol. 8, no. 9, pp. 1293–1297, 1999 and Chang, S. G., Cvetkovic, Z., and Vetterli, M., "Resolution enhancement of images using wavelet transform extrema extrapolation," Proceedings of ICASSP'95, pp. 2379–2382, 1995.

In U.S. Pat. No. 5,717,789, entitled, "Image enhancement by non-linear extrapolation in frequency space,", issued February 1998, the Laplacian Pyramid is used to perform a modified unsharp masking on a smoothly interpolated image. In this case, it is difficult to align a perfect edge appropriately in the interpolated image.

SUMMARY OF THE INVENTION

A method and apparatus for enlargement and resolution enhancement of images in the wavelet domain is described. In one embodiment, the method comprises receiving a wavelet representation of an image, where the wavelet representation comprises wavelet coefficients, and performing localized adaptive interpolation on the wavelet coefficients in the wavelet domain.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 illustrates two-dimensional extension of one-dimensional nonlinear interpolation methods;

DETAILED DESCRIPTION OF THE INVENTION

Figure 2:
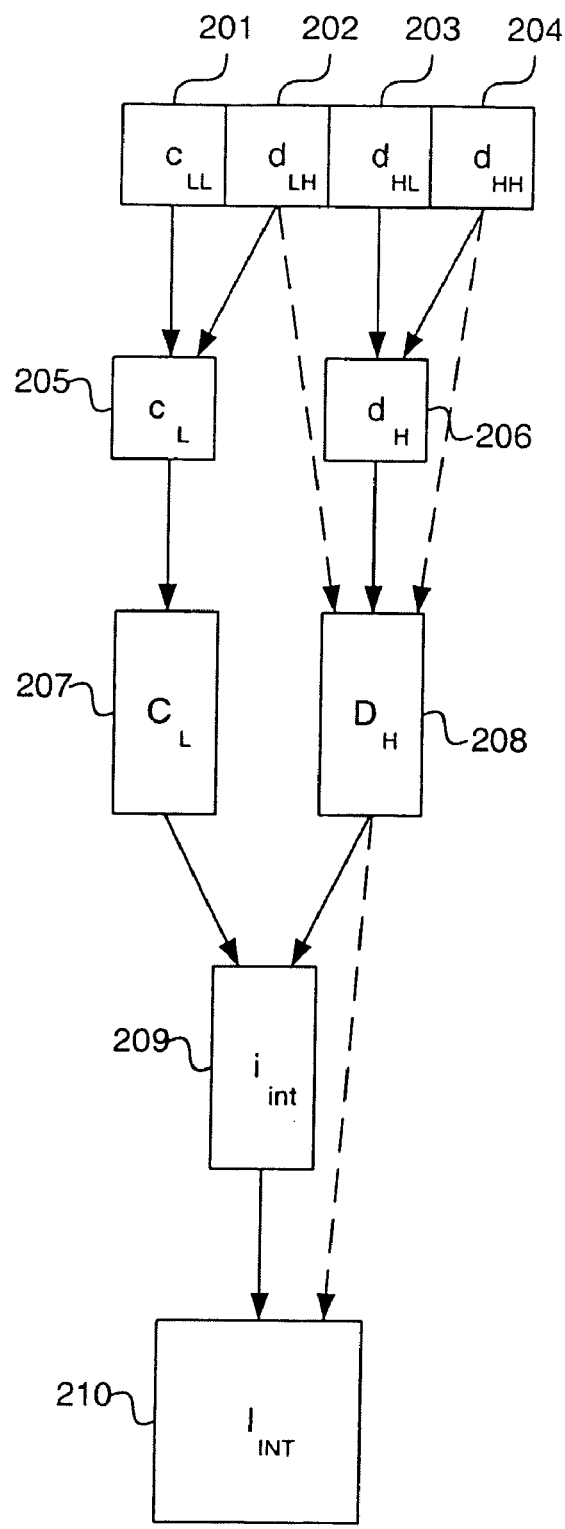
FIG. 2 is a flow diagram illustrating the process for embedding interpolation within an inverse wavelet transform.

A method and apparatus for adaptive nonlinear image enlargement using wavelet transform coefficients is described. Wavelet transform coefficient naturally divide the image into smooth and edge parts. The present invention performs interpolation in the wavelet domain and uses the information in lowpass and highpass coefficients to automatically perform a smooth interpolation in smooth regions and to predict sharp edges in areas of high frequency.

The technique described herein is a modified approach to the idea of nonlinear adaptive interpolation by performing adaptive interpolation in the wavelet domain. In one embodiment, this preserves significant sharp edges that are above the noise level (characterized by, for example, a standard deviation a of wavelet coefficients as described below), where edges can be isolated, including short edges, and does not enhance noise pixels. An edge sensitivity parameter k is eliminated from the prior art technique described above and a parameter p that determines the metric distances are measured in is utilized. Moreover, the technique may adapt the algorithm to arbitrary wavelet systems and transforms. In one embodiment, the technique is combined with wavelet-based denoising and enhancement techniques, and is therefore a useful addition to a wavelet sharpening and smoothing ("WSS") technique. It is also applicable to JPEG 2000 (J2K) compressed images.

In the following description, numerous details are set forth, such as distances between components, types of molding, etc. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Wavelet-based Algorithm

FIG. 2 is a flow diagram of one embodiment of a process for performing non-linear image enlargement using wavelet transform coefficients. In one embodiment, the process is performed by processing logic that may comprise hardware (e.g., circuitry, dedicated logic, etc.), software (such as is run on a general purpose computer system or dedicated machine), or a combination of both.

In one embodiment, the process includes embedding interpolation within an inverse wavelet transform. The differences between samples in Eq. (2) above are interpreted in one embodiment as Haar wavelet coefficients. In such a case, the image is assumed to be given in redundant Haar wavelet coefficients. The first level of decomposition is given by lowpass coefficient $c_{LL}(j,i)$ 201 and detail coefficients $d_{LH}(j,i)$ 202, $d_{HL}(j,i)$ 203 and $d_{HH}(j,i)$ 204. The order of the forward transform is the horizontal transform is performed first followed by the vertical transform. In JPEG 2000, the order is reversed: first the vertical transform is applied followed by application of the horizontal transform. See JPEG2000: ITU-T Rec. T.800-ISO/IEC 15444-1:2000, Information Technology—JPEG2000 Image Coding System. In this case, the inverse transform performs the horizontal transfer in applied followed by the vertical transform.

Processing logic performs a vertical inverse wavelet transform on columns of $c_{LL}$ 201 and $d_{LH}$ 202, with the results being referred to as $c_L$ 205.

Next, processing logic performs a vertical inverse wavelet transform on columns of $d_{HL}$ 203 and $d_{HH}$ 204 with the result being referred to as $d_H$ 206.

Processing logic places the results $c_L$ 205 and $d_H$ 206 on coarse grid images $C_L$ 207 and $D_H$ 208, so that $C_L(2j,i)=c_L(j,i)$, and $D_H(2j,i)=d_H(j,i)$.

Then, processing logic interpolates columns $c_L(2j+1,i)$ and $d_H(2j+1,i)$ according to $$C_L(2j+1,i)=\mu_{j,i}C_L(2j,i)+(1-\mu_{j,i})C_L(2j+2,i) \text{ and} \tag{3}$$

$$D_H(2j+1,i)=\mu_{j,i}D_H(2j,i)+(1-\mu_{j,i})D_H(2j+2,i), \text{ where} \tag{4}$$

$$\mu_{j,i} = \frac{|d_{LH+HH}(j+1,i)|^p}{|d_{LH+HH}(j-1,i)|^p + |d_{LH+HH}(j+1,i)|^p} \tag{5}$$

$$\text{if } |d_{LH+HH}(j,i)|>\epsilon, |d_{LH+HH}(j-1,i)|^p + |d_{LH+HH}(j+1,i)|^p \neq 0 \tag{6}$$

$$\text{and } d_{LH+HH}(j-1,i) \cdot d_{LH+HH}(j+1,i) \geq 0, \tag{7}$$

$\epsilon$ is the measure of the noise level (e.g., standard deviation of coefficients, median, standard deviation or median of absolute values of coefficients in one region (e.g., one particular band of coefficients at particular levels), standard deviation or median of absolute values of coefficients of the same level at each level, standard deviation or median of absolute values of coefficients of different bands at a first level, standard deviation or median of absolute values of coefficients of different bands at each level, etc.) or is manually set. In one embodiment, the noise level may be characterized by the standard deviation σ of wavelet coefficients. In such a case, the threshold indication of the noise level is:

$$\sigma\sqrt{2\log N}$$

for N samples.

Equation(s) is a modified version of Eq.(2) above where the parameter k is eliminated. If the wavelet coefficient to the right is large compared to the one on the left side the interpolating value is placed more to the left side, and vice versa. The parameter p controls whether differences between coefficients are weighted more heavily or less. A good choice for images is p=1. If $|d_{LH+HH}(j,i)|>\epsilon$ and $(|d_{LH+HH}(j-1,i)|^p+|d_{LH+HH}(j+1,i)|^p=0$ or $d_{LH+HH}(j-1,i)\cdot d_{LH+HH}(j+1,i)<0)$ then $\mu_{j,i}$ is set to 1; otherwise, i.e., $$\text{if } |d_{LH+HH}(j,i)|\leq\epsilon, \mu_{j,i} \text{ is set to } 0.5. \tag{8}$$

Processing logic then performs horizontal inverse wavelet transforms on rows of $c_L$ 207 and $d_H$ 208. The result is referred to as $i_{int}$ 209. Processing logic places these samples on a coarse grid image $I_{INT}$ 210 by $I_{INT}(j,2i)=i_{int}(j,i)$.

Processing logic then interpolates rows $I_{INT}(j,2i+1)$ by $$I_{INT}(2j,2i+1)=\nu_{2j,i}I_{INT}(2j,2i)+(1-\nu_{2j,i})I_{INT}(2j,2i+2), \tag{9}$$

$$I_{INT}(2j+1,2i+1)=\nu_{2j,i}I_{INT}(2j+1,2i)+(1-\nu_{2j,i})I_{INT}(2j+1,2i+2), \tag{10}$$

where $$\nu_{2j,i} = \frac{|D_H(2j,i+1)|^p}{|D_H(2j,i-1)|^p + |D_H(2j,i+1)|^p} \tag{11}$$

$$\text{if } |D_H(2j,i)|>\epsilon, |D_H(2j,i-1)|^p+|D_H(2j,i+1)|^p \neq 0 \tag{12}$$

$$\text{and } D_H(2j,i-1)\cdot D_H(2j,i+1)\geq 0. \tag{13}$$

$$D_H(2j,i-1)\cdot D_H(2j,i+1)<0$$

In one embodiment, if $|D_H(2j,i)|>\epsilon$ and $(|D_H(2j,i-1)|^p+|D_H(2j,i+1)|^p=0$ or $D_H(2j,i-1)\cdot D_H(2j,i+1)<0)$, then $\nu_{2j,i}$ is set to 1; otherwise, i.e., if $|D_H(2j,i)|\leq\epsilon$, then $\nu_{j,i}$ is set to 0.5.

In one embodiment, processing logic clips the image $I_{INT}$ back to the range of values for its palette. For example, in one embodiment in which the image is a 256 shade grayscale image, the range is clipped back to the range [0 255].

In equations (6) and (12) above, there is a condition |coefficient|>ϵ. An alternative to setting the threshold ϵ can be to use a classifier result that classifies coefficients into classes A and B, and perform operations based on whether, for example, a coefficient is in class A. This could be used, e.g., in halftone areas. If a halftone classifier is used that decides whether a coefficient belongs to halftone area or not, the equations could be written as:

If $|d_{LH+HL}(j,k)|$ is halftone, $|d_{LH+HL}(j-1,i)v|^p + |d_{LH+HL}(j+1,i)|^p \neq 0$ and $$d_{LH+HH}(j-1,i) \cdot d_{LH+HH}(j+1,i) \geq 0$$

In general it could be written as if $d_{LH+HL}(j,k)$ satisfies condition A, $|d_{LH+HL}(j-1,i)|^p + |d_{LH+HL}(j+1,i)|^p \neq 0$ $$D_H(2j,i-1) \cdot D_H(2j,i+1) \geq 0$$

For example, condition A can be
1) |coefficient|>threshold, when threshold represent noise level in the image,
2) coefficient belongs to halftone area, when classifier for halftone vs. non-halftone is used,
3) coefficient belongs to text, when classifier for text vs. non-text is used, or when MRC (Mixed Raster Content) compression scheme is used, or
4) coefficient belongs to region-of-interest or to a specific layer in JPEG2000.

Figure 3A:
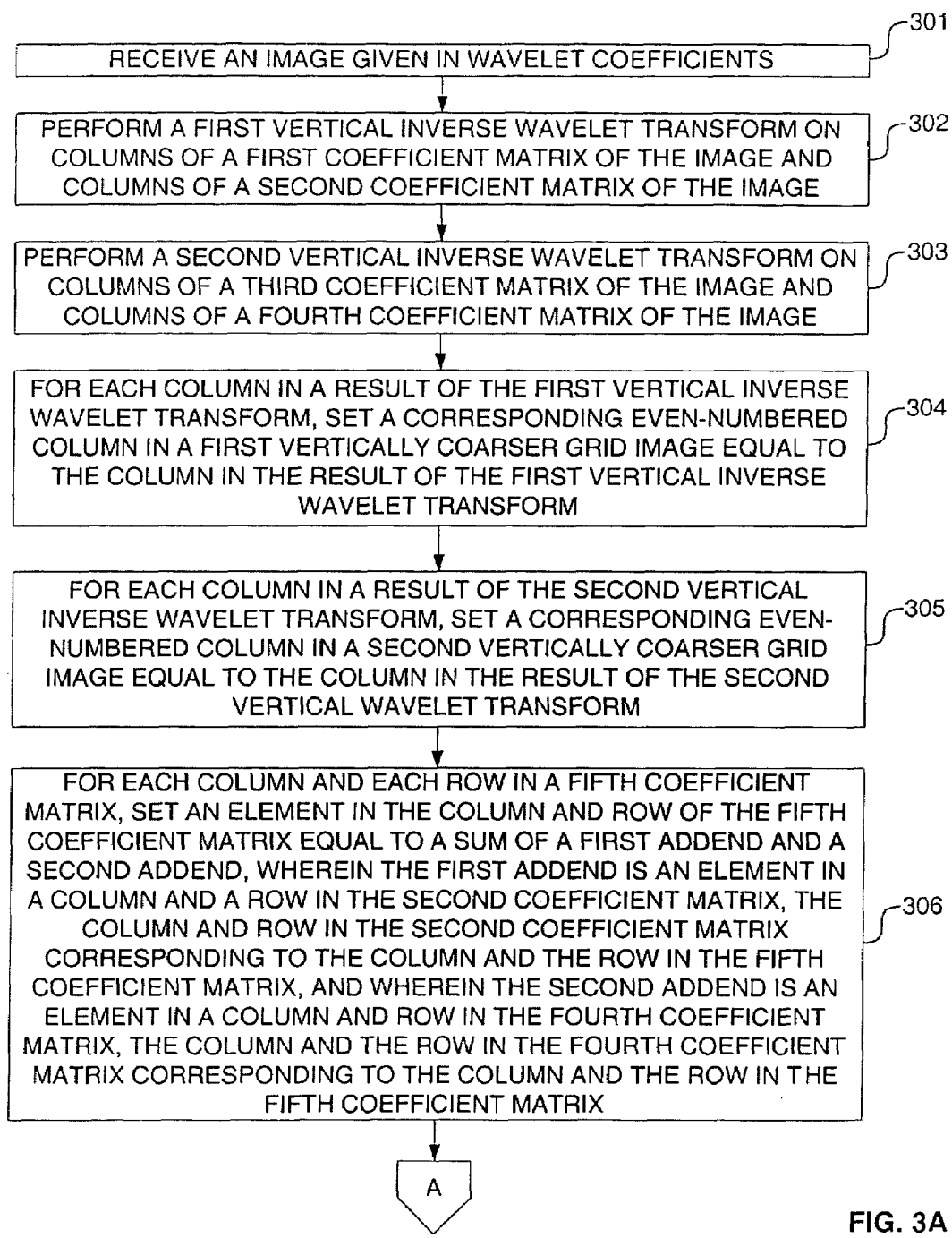
FIGS. 3A, 3B, and 3C are flow diagrams illustrating one embodiment of a process for embedding interpolation within an inverse wavelet transform.
Figure 3B:
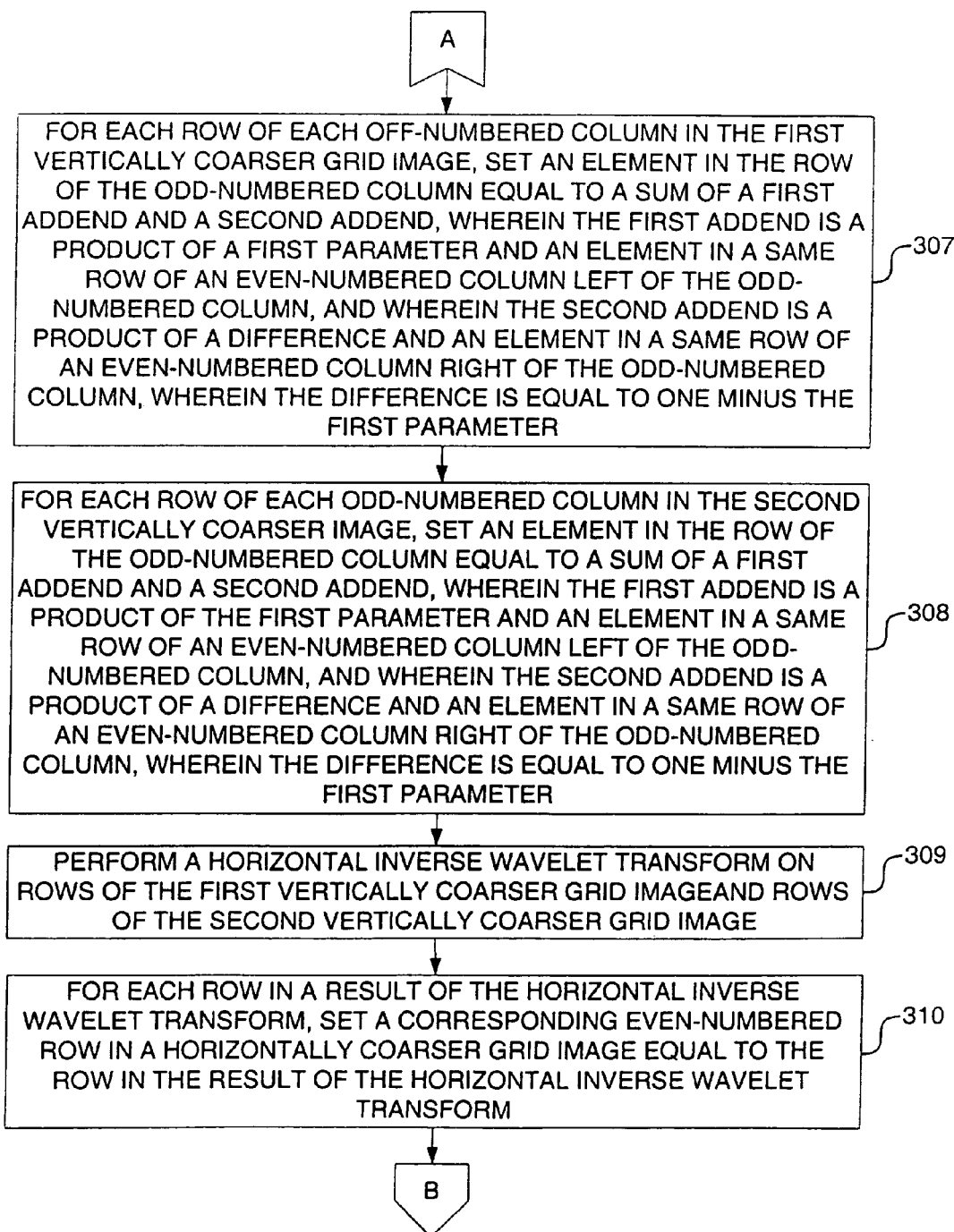
Figure 3C:
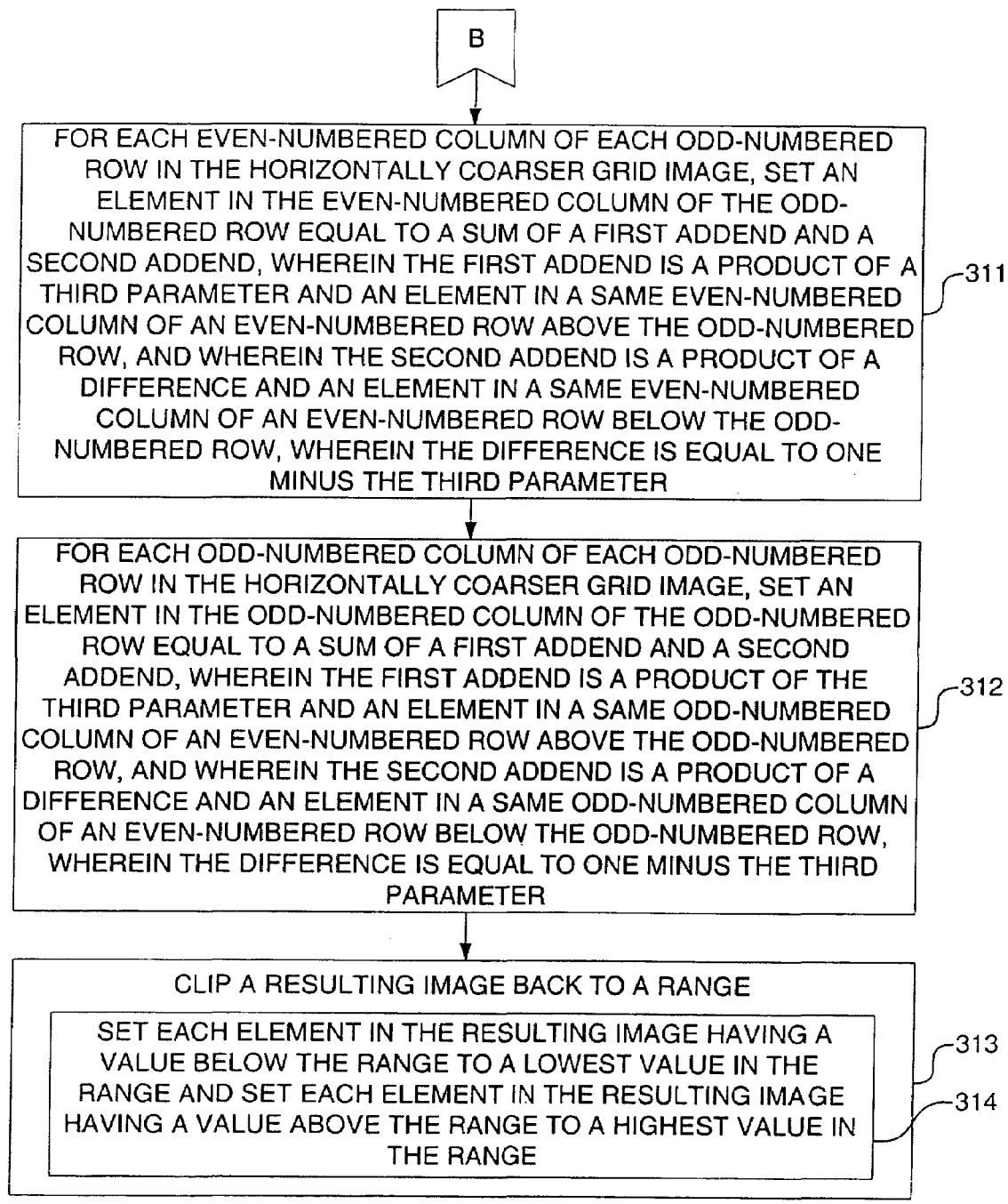

The above process is expressed in different terms below. FIGS. 3A, 3B, and 3C are flow diagrams illustrating embedding an interpolation technique into an inverse wavelet transform. FIG. 2 is a flow diagram of one embodiment of a process for performing non-linear image enlargement using wavelet transform coefficients. In one embodiment, the process is performed by processing logic that may comprise hardware (e.g., circuitry, deducted logic, etc.), software (such as is run on a general purpose computer system or dedicated machine), or a combination of both.

Referring to FIGS. 3A, 3B, and 36, in one embodiment, processing logic receives an image given in wavelet coefficients (processing block 301). In process block 302, processing logic performs a first vertical inverse wavelet transform on columns (j) of a first coefficient matrix of the image (e.g., $c_{LL}(j,i)$) and columns (j) of a second coefficient matrix of the image (e.g., $d_{LH}(j,i)$). Then, in process block 303, processing logic performs a second vertical inverse wavelet transform on columns (j) of a third coefficient matrix of the image (e.g., $d_{HL}(j,i)$) and columns (j) of a fourth coefficient matrix of the image (e.g., $d_{HH}(j,i)$).

Next, in process block 304, for each column (j) in a result of the first vertical inverse wavelet transform (e.g., $c_L(j,i)$), processing logic sets a corresponding even-numbered column (2j) in a first vertically coarser grid image (e.g., $C_L(2j,i)$) equal to the column (j) in the result of the first vertical inverse wavelet transform (e.g., $C_L(2j,i)=c_L(j,i)$).

Then, in process block 305, for each column (j) in a result of the second vertical inverse wavelet transform (e.g., $d_H(j,i)$), processing logic sets a corresponding even-numbered column (2j) in a second vertically coarser grid image (e.g., $D_H(2j,i)$) equal to the column in the result of the second vertical inverse wavelet transform (e.g., $D_H(2j,i)=d_H(j,i)$).

Next, in process block 306, for each column (j) and each row (i) in a fifth coefficient matrix (e.g., $d_{LH+HH}(j,i)$), processing logic sets an element in the column (j) and row (i) of the fifth coefficient matrix equal to a sum of a first addend and a second addend (e.g., $d_{LH+HH}(j,i)=[d_{LH}(j,i)]+[d_{HH}(j,i)]x+y$). The first addend (x) is an element in a column and a row in the second coefficient matrix (e.g., $x=d_{LH}(j,i)$). The column (j) and the row (i) in the second coefficient matrix (e.g., $d_{LH}(j,i)$) correspond to the column (j) and the row (i) in the fifth coefficient matrix (e.g., $d_{LH+HH}(j,i)$). The second addend (y) is an element in a column and a row in the fourth coefficient matrix (e.g., $y=d_{HH}(j,i)$). The column (j) and the row (i) in the fourth coefficient matrix (e.g., $d_{HH}(j,i)$) correspond to the column (j) and the row (i) in the fifth coefficient matrix (e.g., $d_{LH+HH}(j,i)$).

Then, in process block 307, for each row (i) of each odd-numbered column (2j+1) in the first vertically coarser grid image (e.g., $C_L(2j+1,i)$), processing logic sets an element in the row of the odd-numbered column equal to a sum of a first addend and a second addend (e.g., $C_L(2j+1,i)=[\mu_{j,i}C_L(2j,i)]g+[(1-\mu_{j,i})C_L(2j+2,i)]=x+y$). The first addend (x) is a product of a first parameter ($\mu_{j,i}$) and an element in a same row (i) of an even-numbered column to the left of the odd-numbered column (e.g. $x=[\mu_{j,i}][C_L(2j,i)]$). The second addend (y) is a product of a difference (z) and an element in a same row (i) of an even-numbered column to the right of the odd-numbered column (e.g., $y=[(1-\mu_{j,i})][C_L(2j+2,i)]=[z][C_L(2j+2,i)]$). The difference (z) is equal to one minus the first parameter (e.g. $z=1-\mu_{j,i}$).

Next, in process block 308, for each row (i) of each odd-numbered column (2j+1) in the second vertically coarser grid image (e.g., $D_H(2j+1,i)$), processing logic sets an element in the row of the odd-numbered column equal to a sum of a first addend and a second addend (e.g., $D_H(2j+1,i)=[\mu_{j,i}D_H(2j,i)]+[(1-\mu_{j,i})D_H(2j+2,i)]=x+y$). The first addend (x) is a product of the first parameter ($\mu_{j,i}$) and an element in a same row (i) of an even-numbered column to the left of the odd-numbered column (e.g. $x=[\mu_{j,i}][D_H(2j,i)]$). The second addend (y) is a product of a difference (z) and an element in a same row (i) of an even-numbered column to the right of the odd-numbered column (e.g. $y=[z][D_H(2j+2,i)]$). The difference (z) is equal to one minus the first parameter (e.g. $z=1-\mu_{j,i}$).

Then, in process block 309, processing logic performs a horizontal inverse wavelet transform on rows (i) of the first vertically coarser grid image (e.g., $C_L(j,i)$) and rows (i) of the second vertically coarser grid image (e.g., $D_H(j,i)$).

Next, in process block 310, for each row (i) in a result of the horizontal inverse wavelet transform (e.g., $i_{int}(j,i)$), processing logic sets a corresponding even-numbered row (2i) in a horizontally coarser grid image (e.g., $I_{INT}(j,2i)$) equal to the row in the result of the horizontal inverse wavelet transform (e.g., $I_{INT}(j,2i)=i_{int}(j,i)$).

Then, in process block 311, for each even-numbered column (2j) of each odd-numbered row (2i+1) in the horizontally coarser grid image (e.g., $I_{INT}(2j,2i+1)$), processing logic sets an element in the even-numbered column of the odd-numbered row equal to a sum of a first addend and a second addend (e.g., $I_{INT}(2j,2i+1)=[v_{2j,i}I_{INT}(2j,2i)]+[(1-v_{2j,i})I_{INT}(2j,2i+2)]=x+y$). The first addend (x) is a product of a third parameter ($v_{2j,i}$) and an element in a same even-numbered column (2j) of an even-numbered row above the odd-numbered row (e.g. $x=[v_{2j,i}][I_{INT}(2j,2i)]$). The second addend (y) is a product of a difference (z) and an element in a same even-numbered column (2j) of an even-numbered row below the odd-numbered row (e.g., $y=[z][I_{INT}(2j,2i+2)]$). The difference (z) is equal to one minus the third parameter (e.g., $z=1-v_{2j,i}$).

Finally, in process block 312, for each odd-numbered column (2j+1) of each odd-numbered row (2i+1) in the horizontally coarser grid image (e.g., $I_{INT}(2j+1,2i+1)$), processing logic sets an element in the odd-numbered column of the odd-numbered row equal to a sum of a first addend and a second addend (e.g., $I_{INT}(2j+1,2i+1)=[v_{2j,i}I_{INT}(2j+1,2i)]+[(1-v_{2j,i})I_{INT}(2j+1,2i+2)]=x+y$). The first addend (x) is a product of the third parameter ($v_{2j,i}$) and an element in a same odd-numbered column (2j+1) of an even-numbered row above the odd-numbered row (e.g. $x=[v_{2j,i}][I_{INT}(2j+1,2i)]$). The second addend (y) is a product of a difference (z) and an element in a same odd-numbered column (2j+1) of an even-numbered row below the odd-numbered row (e.g., $y=[Z][I_{INT}(2j+1,2i+2)]$). The difference (z) is equal to one minus the third parameter (e.g., $z=1-v_{2j,i}$).

In one embodiment, processing logic clips the resulting image back to a range, shown in process block 313. Process block 314 illustrates one embodiment of the clipping in which each element in the resulting image having a value below the range being set to a lowest value in the range and each element in the resulting image having a value above the range being set to a highest value in the range. Thus, in one embodiment, the range is a range of 256 shades of gray. In another embodiment, the range is a range of a greater number of shades of gray; for example, 65,536 shades. In yet another embodiment, the image is a color image having three ranges for hues of red, green, and blue, respectively. Each of these ranges is similarly clipped. Thus, the desired image palette is maintained throughout the interpolation.

In one embodiment, the wavelet coefficients are redundant Haar wavelet coefficients.

In one embodiment, the first parameter ($\mu_{j,i}$) and the third parameter ($v_{2j,i}$) are set to 0.5.

In one embodiment, if a condition (k') is satisfied, the first parameter ($\mu_{j,i}$) is a numerator divided by a denominator (e.g., $\mu_{j,i}=[|d_{LH+HH}(j+1,i)|^p]/[|d_{LH+HH}(j-1,i)|^p+|d_{LH+HH}(j+1,i)|^p]=x/y$). The numerator (x) is a first absolute value (|x'|) exponentially raised to a power of a second parameter (e.g., $x=[|d_{LH+HH}(j+1,i)|]^{[p]}=|x'|^p$). The first absolute value (|x'|) is an absolute value of a first element (x'). The first element (x') is an element in a column (j+1) and row (i) in the fifth coefficient matrix (e.g., $x'=d_{LH+HH}(j+1,i)$). The column (j+1) in the fifth coefficient matrix is a column right of a column (j) in the fifth coefficient matrix that corresponds to an even-numbered column (2j) left of the odd-numbered column (2j+1) in the first vertically coarser grid image (and also the odd-numbered column (2j+1) in the second vertically coarser grid image). The row (i) in the fifth coefficient matrix corresponds to the row (i) of the odd-numbered column in the first vertically coarser grid image (and also the row (i) of the odd-numbered column in the second vertically coarser grid image). The denominator (y) is a sum of an addend (z) and the numerator (e.g., $y=[|d_{LH+HH}(j-1,i)|^p]+[|d_{LH+HH}(j+1,i)|^p]=z+x$). The addend (z) is a second absolute value (|z'|) exponentially raised to the power of the second parameter (e.g., $z=[|d_{LH-HH}(j-1,i)|]^{[p]}=|z'|^p$). The second absolute value (|z'|) is an absolute value of a second element (z'). The second element (z') is an element in a column (j−1) and row (i) in the fifth coefficient matrix (e.g., $z'=d_{LH+HH}(j-1,i)$). The column (j−1) in the fifth coefficient matrix is a column left of a column (j) in the fifth coefficient matrix that corresponds to an even-numbered column (2j) left of the odd-numbered column (2j+1) in the first vertically coarser grid image (and also the odd-numbered column (2j+1) in the second vertically coarser grid image). The row (i) in the fifth coefficient matrix corresponds to the row (i) of the odd-numbered column in the first vertically coarser grid image (and also the row (i) of the odd-numbered column in the second vertically coarser grid image).

In one embodiment, the second parameter (p) is equal to one.

In one embodiment, the condition (k') is satisfied if an absolute value is greater than a threshold (e.g., $|d_{LH+HH}(j,i)|>\epsilon$) and the denominator is not equal to zero (e.g., $|d_{LH+HH}(j-1,i)|^p+|d_{LH+HH}(j+1,i)|^p \neq 0$) and a product is not less than zero (e.g., $[d_{LH+HH}(j-1,i)][d_{LH+HH}(j+1,i)] \geq 0$). The absolute value is an absolute value of a third element. The third element is an element in a column (j) and row (i) in the fifth coefficient matrix (e.g., $d_{LH+HH}(j,i)$). The column (j) in the fifth coefficient matrix corresponds to an even-numbered column (2j) left of the odd-numbered column (2j+1) in the first vertically coarser grid image (and also the odd-numbered column (2j+1) in the second vertically coarser grid image). The row (i) in the fifth coefficient matrix corresponds to the row (i) of the odd-numbered column in the first vertically coarser grid image (and also the row (i) of the odd-numbered column in the second vertically coarser grid image). The product is a product of the first element and the second element (e.g., $[x'][z']=[d_{LH+HH}(j+1,i)][d_{LH+HH}(j-1,i)]$).

In one embodiment, the first parameter ($\mu_{j,i}$) is set to one if the absolute value is greater than the threshold (e.g., $|d_{LH+HH}(j,i)|>\epsilon$) and the denominator is equal to zero (e.g., $|d_{LH+HH}(j-1,i)|^p+|d_{LH+HH}(j+1,i)|^p=0$).

In one embodiment, the first parameter ($\mu_{j,i}$) is set to one if the absolute value is greater than the threshold (e.g., $|d_{LH+HH}(j,i)|>\epsilon$) and the product is less than zero (e.g., $[d_{LH+HH}(j-1,i)][d_{LH+HH}(j+1,i)]<0$).

In one embodiment, if a condition (k') is satisfied, the third parameter ($v_{2j,i}$) is a numerator divided by a denominator (e.g., $v_{2j,i}=[|D_H(2j,i+1)|^p]/[|D_H(2j,i-1)|^p+|D_H(2j,i+1)|^p]=x/y$), where k' is different than the parameter k mentioned above in the prior art. The numerator (x) is a first absolute value (|x'|) exponentially raised to a power of a second parameter (e.g., $x=[|D_H(2j,i+1)|]^{[p]}=|x'|^p$). The first absolute value (|x'|) is an absolute value of a first element (x'). The first element (x') is an element in a row (i+1) and even-numbered column (2j) in the second vertically coarser grid image (e.g., $x'=D_H(2j,i+1)$). The row (i+1) in the second vertically coarser grid image is a row below a row (i) in the second vertically coarser grid image that corresponds to an even-numbered row (2i) above the odd-numbered row (2i+1) in the horizontally coarser grid image. The even-numbered column (2j) in the second vertically coarser grid image corresponds to the even-numbered column (2j) of the odd-numbered row in the horizontally coarser grid image. The denominator (y) is a sum of an addend (z) and the numerator (e.g., $y=[|D_H(2j,i-1)|^p]+[|D_H(2j,i+1)|^p]=z+x$). The addend (z) is a second absolute value (|z'|) exponentially raised to the power of the second parameter (e.g., $z=[|D_H(2j,i-1)|]^{[p]}=|z'|^p$). The second absolute value (|z'|) is an absolute value of a second element (z'). The second element (z') is an element in a row (i−1) and even-numbered column (2j) in the second vertically coarser grid image (e.g., $z'=D_H(2j,i-1)$). The row (i−1) in the second vertically coarser grid image is a row above a row (i) in the second vertically coarser grid image that corresponds to an even-numbered row (2i) above the odd-numbered row (2i+1) in the horizontally coarser grid image. The even-numbered column (2j) in the second vertically coarser grid image corresponds to the even-numbered column (2j) of the odd-numbered row in the horizontally coarser grid image.

In one embodiment, the condition (k') is satisfied if an absolute value is greater than a threshold (e.g., $|D_H(2j,i)|>\epsilon$) and the denominator is not equal to zero (e.g., $|D_H(2j,i-1)|^p+|D_H(2j,i+1)|^p\neq 0$) and a product is not less than zero (e.g., $[D_H(2(2j,i-1)][D_H(2j,i+1)]\leq 0$). The absolute value is an absolute value of a third element. The third element is an element in a row (i) and even-numbered column (2j) in the second vertically coarser grid image (e.g., $D_H(2j,i)$). The row (i) in the second vertically coarser grid image corresponds to an even-numbered row (2i) above the odd-numbered row (2i+1) in the horizontally coarser grid image. The even-numbered column (2j) in the second vertically coarser grid image corresponds to the even-numbered column (2j) of the odd-numbered row in the horizontally coarser grid image. The product is a product of the first element and the second element (e.g., $[x'][z']=[D_H(2j,i-1)][D_H(2j,i+1)]$).

In one embodiment, the third parameter ($v_{2j,i}$) is set to one if the absolute value is greater than the threshold (e.g., $|D_H(2j,i)|>\epsilon$) and the denominator is not equal to zero (e.g., $|D_H(2j,i-1)|^p+|D_H(2j,i+1)|^p\neq 0$).

In one embodiment, the third parameter ($v_{2j,i}$) is set to one if the absolute value is greater than the threshold (e.g., $|D_H(2j,i)|>\epsilon$) and the product is not less than zero (e.g., $[D_H(2j,i-1)][D_H(2j,i+1)]\geq 0$).

The threshold ($\epsilon$) may prevent noise pixels, including halftone noise pixels, from being treated as strong edges. In smooth regions where detail coefficients are zero, the interpolation may reduce to linear interpolation.

Figure 4:
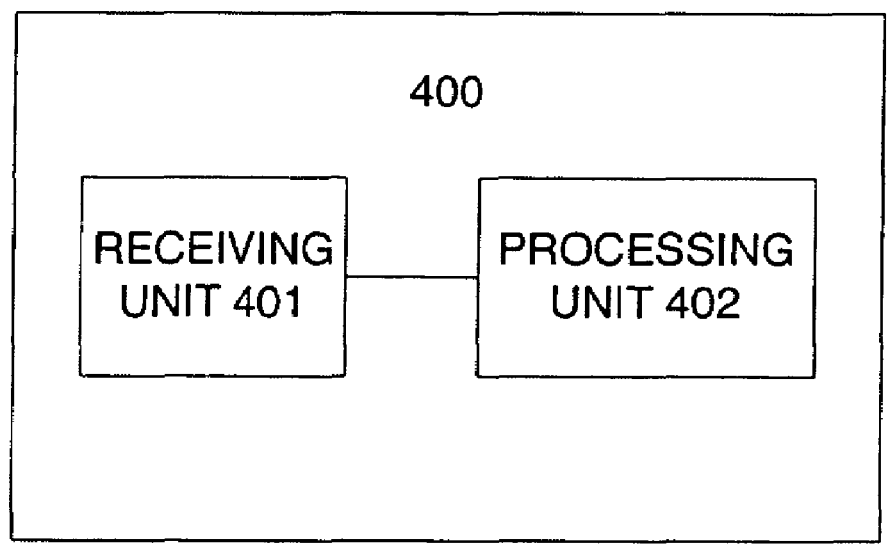
FIG. 4 is a schematic diagram illustrating an apparatus to perform interpolation embedded within an inverse wavelet transform according to one embodiment.

FIG. 4 is a block diagram of one embodiment of an apparatus to perform interpolation embedded within an inverse wavelet transform. Referring to FIG. 4, the apparatus 400 comprises a receiving unit 401 to receive an image given in wavelet coefficients and a processing unit 402 coupled with the receiving unit 401. The processing unit 402 performs the functionality described above. In one embodiment, the apparatus shown in FIG. 4 comprises a multifunction machine.

Figure 5:
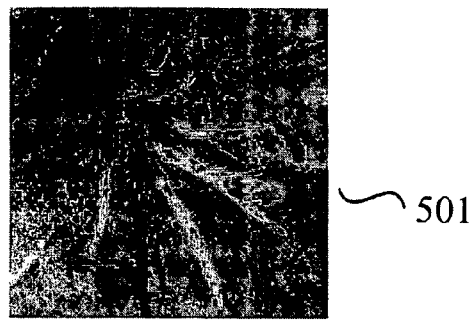
FIG. 5 is a schematic diagram illustrating an example of adaptive nonlinear image enlargement using wavelet transform coefficients compared with standard bicubic interpolation.
Figure 5:
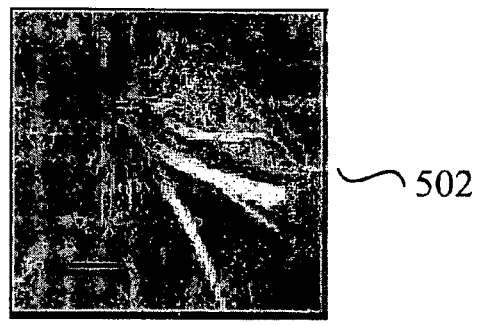

FIG. 5 is a schematic diagram illustrating an example of adaptive nonlinear image enlargement using wavelet transform coefficients compared with standard bicubic interpolation according to one embodiment. Image 501 was generated using standard bicubic interpolation. Image 502 was generated using wavelet-based nonlinear interpolation. In one embodiment, the pixel differences in the prior art algorithm are equivalent to Haar wavelet coefficients of a redundant wavelet transform. In contrast to the prior art algorithm, in one embodiment, the technique set forth herein using a redundant Haar transform interpolates a perfect step edge "exactly," i.e., the interpolated signal has also a perfect step edge.

Figure 6:
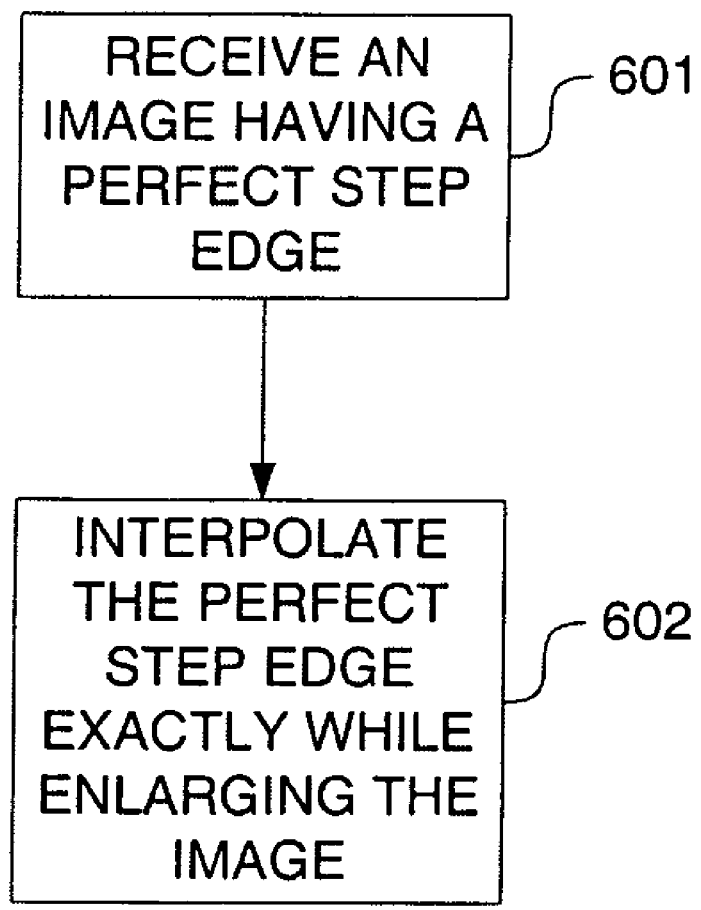
FIG. 6 is a flow diagram illustrating one embodiment of a process for interpolating a step edge.

FIG. 6 is a flow diagram illustrating one embodiment of a process for interpolating a step edge. In one embodiment, an image having a perfect step edge is received in process block 601, and the perfect step edge is interpolated exactly while the image is enlarged in process block 602.

In one embodiment, the technique is also applied using redundant wavelet transform coefficients for arbitrary wavelet types. It is also used for maximal decimated wavelet transforms and complex wavelet transforms.

In one embodiment, the technique is extended to include information from various levels of the wavelet decomposition by, e.g., using wavelet coefficients from larger scales for computation of the parameters $\mu$ and $v$.

In combination with a wavelet sharpening and smoothing ("WSS") technique, the enlargement may be performed after denoising by thresholding and sharpening/smoothing by rescaling of wavelet coefficients. For more information on WSS, see U.S. patent application Ser. No. 09/467,544, entitled "Multiscale Sharpening and Smoothing With Wavelets" filed on Dec. 10, 1999, and assigned to the corporate assignee of the present invention.

In one embodiment, for the purpose of enlargement of JPEG2000 or similar compressed images, the technique described above is incorporated into the last level of the inverse wavelet transform on the decoder side.

Applications

Figure 7:
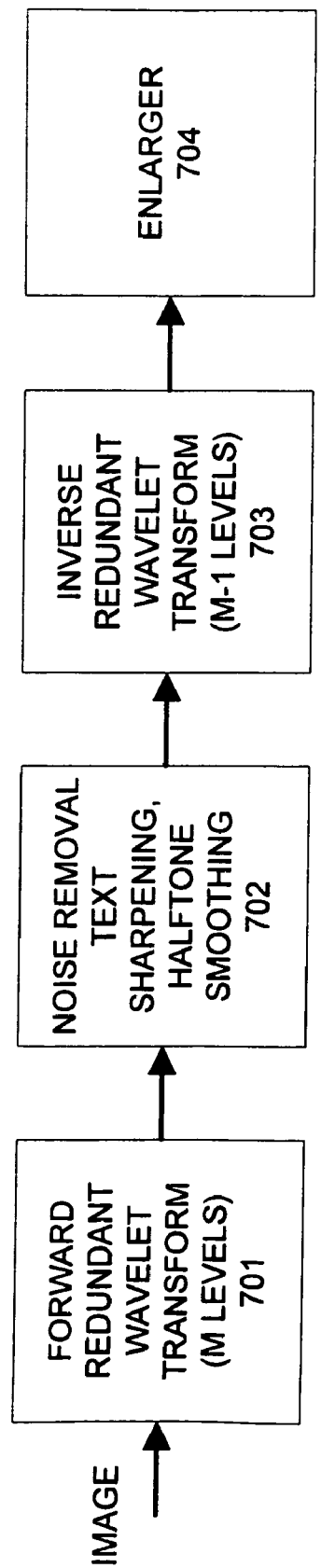
FIG. 7 illustrates a digital copier having a wavelet-based enhancement system.

There are a number of additional applications in which the adaptive non-linear image enlargement described herein may be advantageous. For example, adaptive non-linear image enlargement may be used in the enlargement process in a digital copier processing path. Such a system is shown in FIG. 7. Referring to FIG. 7, a forward redundant wavelet transform 701 is applied to an image. The wavelet transform 701 may be applied M times to the image, such that there are M levels, where M is greater than 1. After applying the forward redundant wavelet transform 701, noise removal, text sharpening, halftone smoothing is applied to the coefficients at image processor 702. After such processing, an inverse redundant wavelet transform 703 is applied to the processed coefficients. In one embodiment, the inverse redundant wavelet transform 703 is applied M−1 times so that there are M−1 levels. After applying the inverse redundant wavelet transform 703, an enlarger 704 performs the enlargement process described herein. Note that each of these blocks may be implemented in software, hardware or a combination of both.

Figure 8:
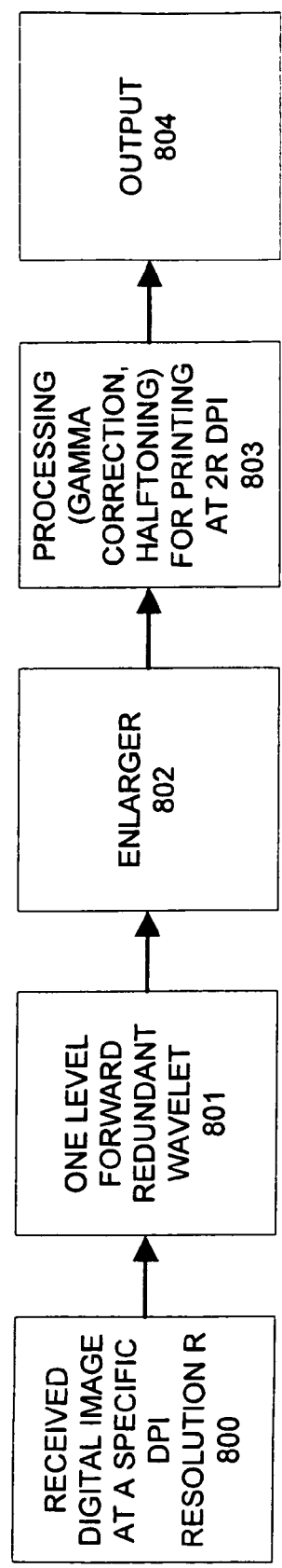
FIG. 8 illustrates a process performed for high resolution printing.

The adaptive non-linear image enlargement may be utilized in an upsampling process in which upsampling is done for printing at a higher dpi, e.g., images scanned at 600 dpi and printed at 1200 dpi. Such a system is shown in FIG. 8. Referring to FIG. 8, a one level redundant wavelet transform 801 is applied to a received digital image at a specific dpi resolution R (800). The coefficients are output to enlarger 802 which performs the enlargement process described herein. After enlargement, processing is performed for printing at 2R dpi by image processor 803. The processing may include gamma correction, halftoning, etc. The output 804 is a processed image. In this manner, the adaptive non-linear image enlargement process is used to repair the lower resolution image for high resolution printing. Note that each processing element in FIG. 8 may be implemented in hardware, software, or a combination of both.

Other applications include the use of the adaptive non-linear image enlargement technique described herein for the enlargement of JPEG2000 images. This might require an addition to a JPEG decoder to compensate for the non-linear image enlargement. Another application is digital cameras. Specifically, the adaptive non-linear image enlargement process may be performed for demosaicing in a digital camera.

An Exemplary Computer System

Figure 9:
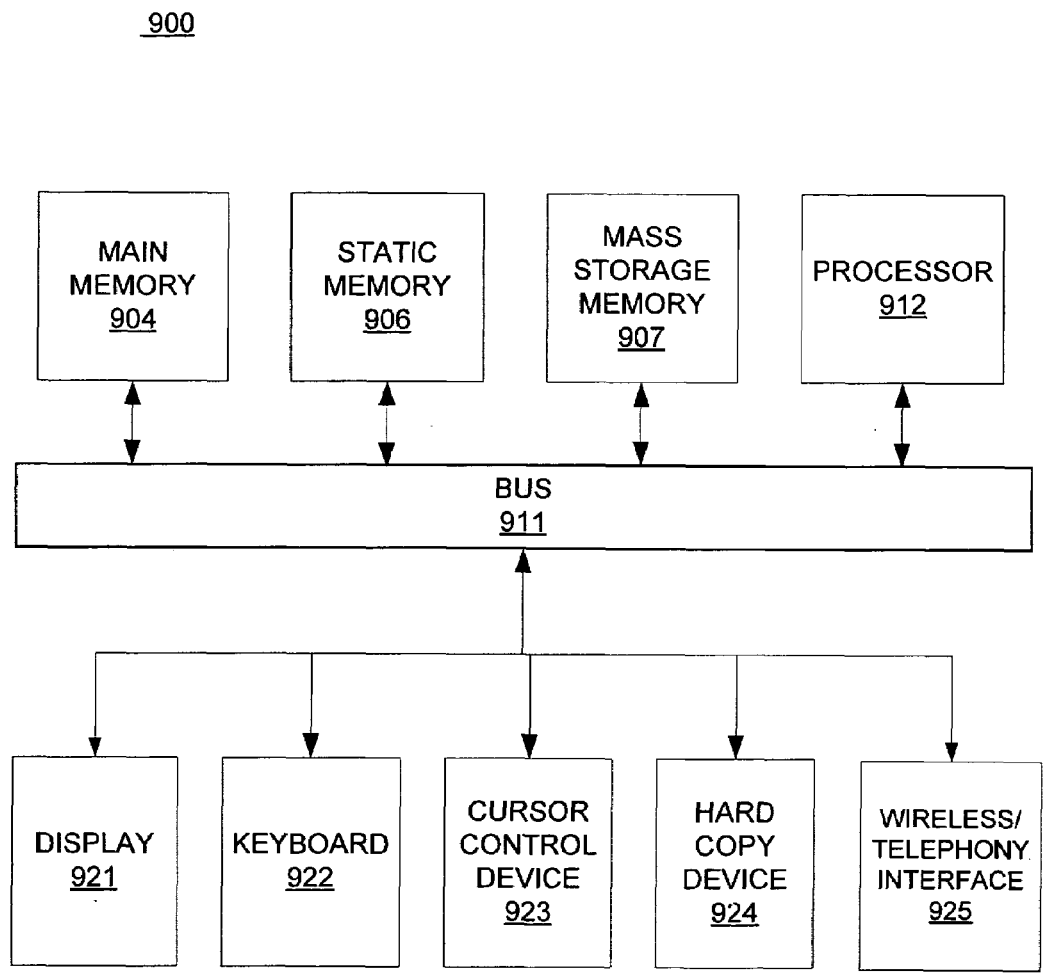
FIG. 9 is a block diagram of one embodiment of a computer system.

FIG. 9 is a block diagram of an exemplary computer system that may perform one or more of the operations described herein. Referring to FIG. 9, computer system 900 may comprise an exemplary client 950 or server 900 computer system. Computer system 900 comprises a communication mechanism or bus 911 for communicating information, and a processor 912 coupled with bus 911 for processing information. Processor 912 includes a microprocessor, but is not limited to a microprocessor, such as, for example, Pentium™, PowerPC™, etc.

System 900 further comprises a random access memory (RAM), or other dynamic storage device 904 (referred to as main memory) coupled to bus 911 for storing information and instructions to be executed by processor 912. Main memory 904 also may be used for storing temporary variables or other intermediate information during execution of instructions by processor 912.

Computer system 900 also comprises a read only memory (ROM) and/or other static storage device 906 coupled to bus 911 for storing static information and instructions for processor 912, and a data storage device 907, such as a magnetic disk or optical disk and its corresponding disk drive. Data storage device 907 is coupled to bus 911 for storing information and instructions.

Computer system 900 may further be coupled to a display device 921, such as a cathode ray tube (CRT) or liquid crystal display (LCD), coupled to bus 911 for displaying information to a computer user. An alphanumeric input device 922, including alphanumeric and other keys, may also be coupled to bus 911 for communicating information and command selections to processor 912. An additional user input device is cursor control 923, such as a mouse, trackball, trackpad, stylus, or cursor direction keys, coupled to bus 911 for communicating direction information and command selections to processor 912, and for controlling cursor movement on display 921.

Another device that may be coupled to bus 911 is hard copy device 924, which may be used for printing instructions, data, or other information on a medium such as paper, film, or similar types of media. Furthermore, a sound recording and playback device, such as a speaker and/or microphone may optionally be coupled to bus 911 for audio interfacing with computer system 900. Another device that may be coupled to bus 911 is a wired/wireless communication capability 925 to communication to a phone or handheld palm device.

Note that any or all of the components of system 900 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method comprising:
   receiving a wavelet representation of an image, the wavelet representation comprising wavelet coefficients; and
   performing localized adaptive interpolation on the wavelet coefficients in the wavelet domain, including
      weighting, more heavily or less heavily, differences between coefficients neighboring an interpolation value based on a parameter when performing localized adaptive interpolation.

2. The method defined in claim 1 further comprising performing upsampling using adaptive filters on wavelet coefficients.

3. The method defined in claim 2 wherein filter coefficients of the adaptive filters are computed from wavelet coefficients.

4. The method defined in claim 1 wherein performing localized adaptive interpolation comprises performing linear interpolation on the wavelet coefficients.

5. The method defined in claim 1 wherein performing localized adaptive interpolation comprises performing interpolation on at least one of the wavelet coefficients if the at least one coefficients of the wavelet coefficients meets a condition.

6. The method defined in claim 5 wherein the condition is whether the at least one coefficient is greater than a threshold.

7. The method defined in claim 6 wherein the threshold represents a noise level in the image.

8. The method defined in claim 5 wherein the condition is whether the at least one coefficient belongs to an area in the image.

9. The method defined in claim 8 wherein the area comprises a halftone area in the image.

10. The method defined in claim 9 further comprising a classifier determining whether the at least one wavelet coefficient is in the halftone area of the image.

11. The method defined in claim 8 wherein the area comprises a text area in the image.

12. The method defined in claim 11 further comprising a classifier determining whether the at least one wavelet coefficient is in the text area of the image.

13. The method defined in claim 8 wherein the area comprises a region-of-interest.

14. The method defined in claim 13 wherein the region-of-interest is a JPEG 2000 region of interest.

15. The method defined in claim 8 wherein the area comprises a JPEG 2000 layer.

16. The method defined in claim 1 further comprising performing upsampling using coefficient dependent interpolation.

17. A method comprising:
   receiving a wavelet representation of an image, the wavelet representation comprising wavelet coefficients; and
   performing localized adaptive interpolation on the wavelet coefficients in the wavelet domain, wherein performing localized adaptive interpolation on the wavelet coefficients in the wavelet domain comprises
      applying a vertical inverse transform on columns of lowpass coefficients and detail coefficients to produce first and second sets of results;
      placing the first and second sets of results in first and second grid images, respectively, in which every other column in each of the first and second grid images does not include values;
      performing interpolation using an interpolation technique on values in columns in the first and second grid images to create values for columns in the first and second grid images that do not include values;
      applying a horizontal inverse transform on rows of the first and second grid images to produce second and third sets of results;
      placing the third and fourth sets of results in third and fourth grid images, respectively, in which every other row in each of the third and fourth grid images does not include values; and
      performing an interpolation using the interpolation technique on values in rows in the third and fourth grid images to create values for rows in the third and fourth grid images that do not include values.

18. The method defined in claim 17 wherein the interpolation technique comprises a nonlinear interpolation.

19. The method defined in claim 17 further comprising clipping resulting values to a predetermined range.

20. A method comprising:
   receiving a wavelet representation of an image, the wavelet representation comprising wavelet coefficients; and performing localized adaptive interpolation on the wavelet coefficients in the wavelet domain, wherein performing localized adaptive interpolation on the wavelet coefficients in the wavelet domain comprises:
  applying a horizontal vertical inverse transform on columns of lowpass coefficients and detail coefficients to produce first and second sets of results;
  placing the first and second sets of results in first and second grid images, respectively, in which every other column in each of the first and second grid images does not include values;
  performing interpolation using an interpolation technique on values in columns in the first and second grid images to create values for columns in the first and second grid images that do not include values;
applying a vertical inverse transform on rows of the first and second grid images to produce second and third sets of results;
placing the third and fourth sets of results in third and fourth grid images, respectively, in which every other row in each of the third and fourth grid images does not include values; and
  performing an interpolation using the interpolation technique on values in rows in the third and fourth grid images to create values for rows in the third and fourth grid images that do not include values.

21. An apparatus comprising:
means for a wavelet representation of an image, the wavelet representation a means for wavelet coefficients; and
means for localized adaptive interpolation on the wavelet coefficients in the wavelet domain, including
  means for weighting, more heavily or less heavily, differences between coefficients neighboring an interpolation value based on a parameter when performing localized adaptive interpolation.

22. The apparatus defined in claim 21 further comprising means for performing upsampling using adaptive filters on wavelet coefficients.

23. The apparatus defined in claim 22 wherein filter coefficients of the adaptive filters are computed from wavelet coefficients.

24. The apparatus defined in claim 21 wherein the means for performing localized adaptive interpolation comprises means for performing linear interpolation on the wavelet coefficients.

25. The apparatus defined in claim 21 wherein the means for performing localized adaptive interpolation comprises means for performing interpolation on at least one of the wavelet coefficients if the at least one coefficients of the wavelet coefficients meets a condition.

26. The apparatus defined in claim 25 wherein the condition is whether the at least coefficient is greater than a threshold.

27. The apparatus defined in claim 26 wherein the threshold represents a noise level in the image.

28. The apparatus defined in claim 25 wherein the condition is whether the at least one coefficient belongs to an area in the image.

29. The apparatus defined in claim 28 wherein the area comprises a halftone area in the image.

30. The apparatus defined in claim 29 further comprising a classifier to determine whether the at least one wavelet coefficient is in the halftone area of the image.

31. The apparatus defined in claim 28 wherein the area comprises a text area in the image.

32. The apparatus defined in claim 31 further comprising a classifier to determine whether the at least one wavelet coefficient is in the text area of the image.

33. The apparatus defined in claim 28 wherein the area comprises a region-of-interest.

34. The apparatus defined in claim 33 wherein the region-of-interest is a JPEG 2000 region of interest.

35. The apparatus defined in claim 28 wherein the area comprises a JPEG 2000 layer.

36. The apparatus defined in claim 21 further comprising means for performing upsampling using coefficients dependent interpolation.

37. An apparatus comprising:
means for a wavelet representation of an image, the wavelet representation a means for wavelet coefficients; and
means for localized adaptive interpolation on the wavelet coefficients in the wavelet domain, wherein the means for performing localized adaptive interpolation on the wavelet coefficients in the wavelet domain comprises
  means for applying a vertical inverse transform on columns of lowpass coefficients and detail coefficients to produce first and second sets of results;
  means for placing the first and second sets of results in first and second grid images, respectively, in which every other column in each of the first and second grid images does not include values;
  means for performing interpolation using an interpolation technique on values in columns in the first and second grid images to create values for columns in the first and second grid images that do not include values;
  means for applying a horizontal inverse transform on rows of the first and second grid images to produce second and third sets of results;
  means for placing the third and fourth sets of results in third and fourth grid images, respectively, in which every other row in each of the third and fourth grid images does not include values; and
    means for performing an interpolation using the interpolation technique on values in rows in the third and fourth grid images to create values for rows in the third and fourth grid images that do not include values.

38. The apparatus defined in claim 37 wherein the means for performing the interpolation technique comprises a non-linear interpolation.

39. The apparatus defined in claim 37 further comprises means for clipping resulting values to a predetermined range.

40. An article of manufacture comprising one or more recordable media having executable instructions stored thereon which, when executed by a system, causes the system to perform a method comprising:
  receiving a wavelet representation of an image, the wavelet representation comprising wavelet coefficients; and
  performing localized adaptive interpolation on the wavelet coefficients in the wavelet domain, including
    weighting, more heavily or less heavily, differences between coefficients neighboring an interpolation value based on a parameter when performing the localized adaptive interpolation.

41. The article of manufacture defined in claim 40 further comprising instructions to perform upsampling using adaptive filters on wavelet coefficients.

42. The article of manufacture defined in claim 40 wherein filter coefficients of the adaptive filters are computed from wavelet coefficients.

43. The article of manufacture defined in claim 40 wherein the instructions to perform localized adaptive interpolation comprise instructions to perform linear interpolation on the wavelet coefficients.

44. The article of manufacture defined in claim 40 wherein the instructions to perform localized adaptive interpolation comprise instructions to perform interpolation on at least one of the wavelet coefficients if the at least one coefficients of the wavelet coefficients meets a condition.

45. The article of manufacture defined in claim 44 wherein the condition is whether the at least coefficient is greater than a threshold.

46. The article of manufacture defined in claim 45 wherein the threshold represents a noise level in the image.

47. The article of manufacture defined in claim 44 wherein the condition is whether the at least one coefficient belongs to an area in the image.

48. The article of manufacture defined in claim 47 wherein the area comprises a halftone area in the image.

49. The article of manufacture defined in claim 48 further comprising instruction which, when executed by the system, cause the system to determine whether the at least one wavelet coefficient is in the halftone area of the image.

50. The article of manufacture defined in claim 47 wherein the area comprises a text area in the image.

51. The article of manufacture defined in claim 50 further comprising instructions which, when executed by the system, cause the system to determine whether the at least one wavelet coefficient is in the text area of the image.

52. The article of manufacture defined in claim 47 wherein the area comprises a region-of-interest.

53. The article of manufacture defined in claim 52 wherein the region-of-interest is a JPEG 2000 region of interest.

54. The method defined in claim 53 wherein the area comprises a JPEG 2000 layer.

55. The article of manufacture defined in claim 40 further comprising instructions which, when executed by the system, cause the system to perform upsampling using coefficients dependent interpolation.

56. An article of manufacture comprising one or more recordable media having executable instructions stored thereon which, when executed by a system, causes the system to perform a method comprising:
  receiving a wavelet representation of an image, the wavelet representation comprising wavelet coefficients; and
  performing localized adaptive interpolation on the wavelet coefficients in the wavelet domain, wherein performing localized adaptive interpolation on the wavelet coefficients in the wavelet domain is performed by
    applying a vertical inverse transform on columns of lowpass coefficients and detail coefficients to produce first and second sets of results;
    placing the first and second sets of results in first and second grid images, respectively, in which every other column in each of the first and second grid images does not include values;
    performing interpolation using an interpolation technique on values in columns in the first and second grid images to create values for columns in the first and second grid images that do not include values;
  applying a horizontal inverse transform on rows of the first and second grid images to produce second and third sets of results;
  placing the third and fourth sets of results in third and fourth grid images, respectively, in which every other row in each of the third and fourth grid images does not include values; and
  performing an interpolation using the interpolation technique on values in rows in the third and fourth grid images to create values for rows in the third and fourth grid images that do not include values.

57. The article of manufacture defined in claim 56 wherein the interpolation technique comprises a nonlinear interpolation.

* * * * *